United States Patent [19]
Ohta et al.

[11] 3,805,597
[45] Apr. 23, 1974

[54] ULTRASONIC FLAW DETECTOR

[75] Inventors: Koji Ohta, Yokohama; Eiji Yamamoto; Koji Sekiguchi, both of Tokyo, all of Japan

[73] Assignee: Kabushikikaisha Tokyo Keiki, Tokyo, Japan

[22] Filed: Sept. 6, 1972

[21] Appl. No.: 286,537

[30] Foreign Application Priority Data
Sept. 14, 1971  Japan............................... 46-71405

[52] U.S. Cl. .............................................. 73/67.9
[51] Int. Cl. .......................................... G01n 29/04
[58] Field of Search............ 73/67.7, 67.8 R, 67.8 S, 73/67.9

[56] References Cited
UNITED STATES PATENTS
2,969,671   1/1961   Sproule............................. 73/67.9
3,373,602   3/1968   Wendt et al. ..................... 73/67.9 X
3,481,186   12/1969  Cellitti et al. ....................... 73/67.9
3,599,478   8/1971   Weinbaum........................... 73/67.9

Primary Examiner—Charles A. Ruehl
Attorney, Agent, or Firm—Hill, Sherman, Meroni, Gross & Simpson

[57] ABSTRACT

An ultrasonic flaw detector having a pulse generator, a probe disposed on a member to be detected and supplied with a pulse signal from the pulse generator for producing an ultrasonic wave, a receiver supplied with a signal corresponding to an echo signal from the probe, a delay circuit, a gate signal generator circuit supplied with the signal from the delay circuit, an AND-gate circuit supplied with the outputs from the gate signal generator circuit and receiver, and an indicator. In this case, the gate signal generator circuit consists of a plurality of shift registers and the AND-circuit consists of a plurality of AND-circuit elements.

3 Claims, 11 Drawing Figures

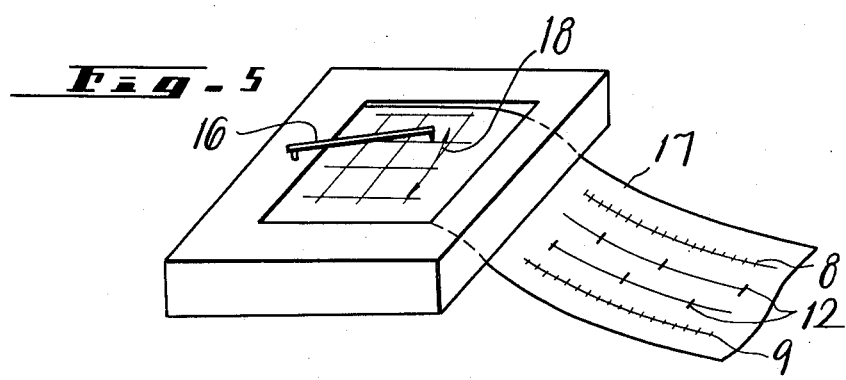
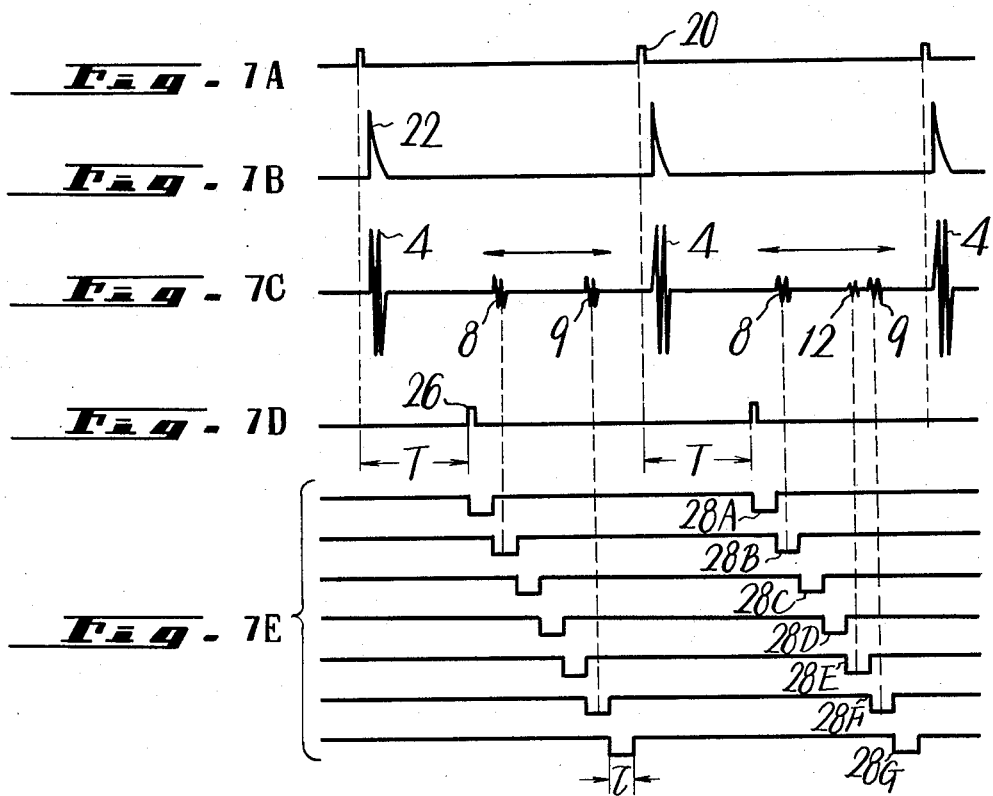

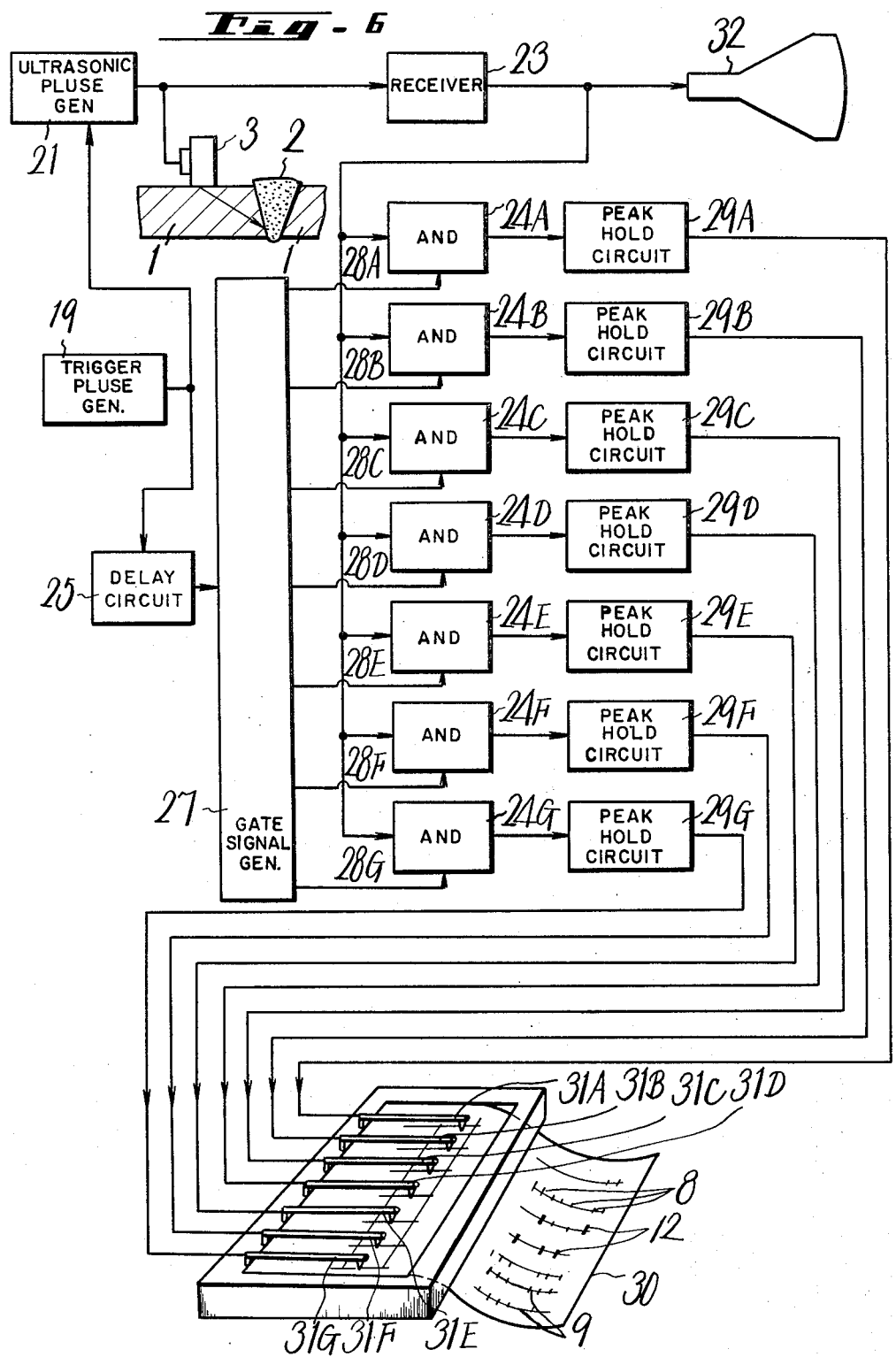

ULTRASONIC FLAW DETECTOR

BACKGROUND OF THE INVENTION

1. Field of the Invention

This invention relates to an ultrasonic flaw detector for detecting flaws such as cracks or the like, for example, in welded portions of a steel plate or the like.

2. Description of the Prior Art

Conventional types of ultrasonic flaw detector are defective in that where the surface of a member to be examined, for example, a bead of weld, is uneven or irregular, positive flow detection is very difficult over the entire area of a welded portion of the member to be detected.

SUMMARY OF THE INVENTION

This invention is directed to an ultrasonic flaw detector in which a detected output from a search unit or a probe is supplied to a plurality of gate circuits and a plurality of gate signals of predetermined pulse widths are obtained while being sequentially delayed in time continuously a predetermined period of time after the excitation of the probe and are supplied to the gate circuits corresponding thereto respectively to derive the detected output from each gate circuit.

Accordingly, the primary object of this invention is to provide a novel ultrasonic flaw detector which is entirely free from the defects experienced in the conventional devices of this kind.

Another object of this invention is to provide an ultrasonic flaw detector which is simple in construction and ensures flaw detection even where the distance between the probe and a welded portion to be examined for detecting cracks or the like varies in the lengthwise direction of the latter.

Other objects, features and advantages of this invention will become apparent from the following description taken in conjunction with the accompanying drawings.

BRIEF DESCRIPTION OF THE DRAWINGS

FIG. 5 is a perspective view schematically showing the manner of recording the flaw detection result on a recording paper;

FIG. 6 is a system diagram illustrating one example of this invention; and

FIG. 7 is a waveform diagram for explaining the operation of the device exemplified in FIG. 6.

DESCRIPTION OF THE PREFERRED EMBODIMENTS

Figure 2:
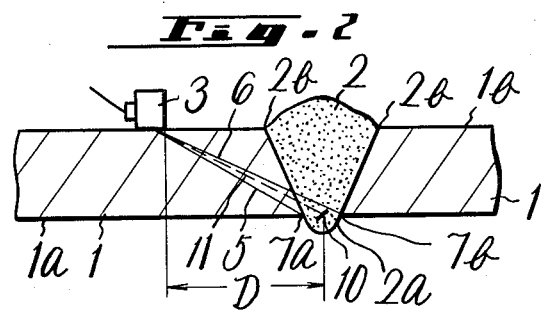
FIG. 2 is a cross-sectional view along the line II—II in FIG. 1.
Figure 3:
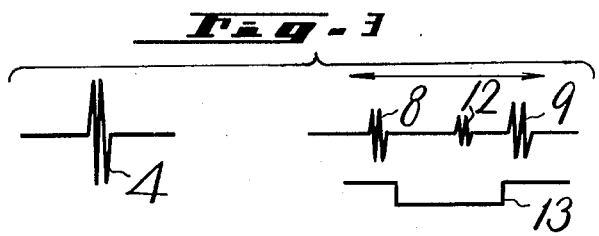
FIGS. 3 and 4 are waveform diagrams used for explaining the flaw detection.

To facilitate a better understanding of this invention, a description will be given first of a prior art ultrasonic flaw detector of this kind in connection with FIGS. 1 to 3.

Figure 1:
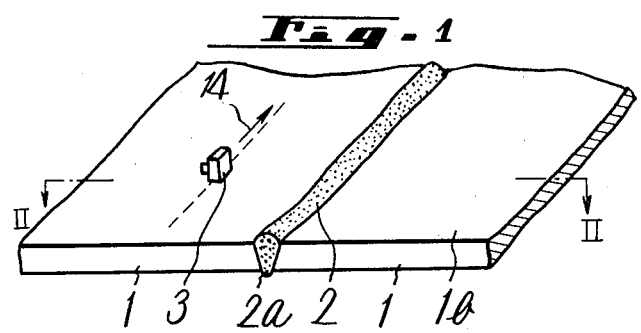
FIG. 1 is a perspective view schematically showing the manner of flaw detection of a welded portion.

FIG. 1 shows the manner of detecting cracks or the like in a welded portion of a steel plate by means of ultrasonic flaw detection. In the figure, reference numeral 1 indicates steel plates, 2 their welded portion and 3 an ultrasonic probe. A flaw such as a crack or the like in the welded portion 2, especially in a portion 2a of its back where the distance between the opposed steel plates 1 is the shortest presents a problem, so that, in the ultrasonic flaw detection, an ultrasonic beam is emitted toward the portion 2a by means of the probe 3, for example, an ultrasonic angle beam search unit or probe, as shown in FIG. 2. In such a case, when a transmitting wave 4 is supplied to the probe 3, the ultrasonic beam emitted from the probe 3 reaches edges 7a and 7b of the steel plates 1 on the backs 1a thereof which are contiguous to the welded portion 2 along passages as indicated by solid lines 5 and 6, and the beam reflected back therefrom is obtained as echoes 8 and 9, as depicted in FIG. 3. Where a crack 10 is present in the back portion 2a of the welded portion 2, the beam having reached it as indicated by a broken line 11 in FIG. 2 is obtained as a flaw echo 12 between the echoes 8 and 9 as shown in FIG. 3. In this case, the time until the echoes 8 and 9 are obtained from the transmission of the wave 4 to the probe 3 is dependent upon the distance D between the probe 3 and the portion 2a of the welded part 2. Consequently, it is possible to pick up only the flaw echo 12 by gating the received detected output with a gate signal 13 of a predetermined width which is obtained a predetermined period of time after the transmission of the wave 4 to the probe 3, as shown in FIG. 3.

In this case, the probe 3 is moved on the steel plate 1 along the welded part 2 as indicated by an arrow 14 in FIG. 1 to achieve flaw detection over the entire area of the welded part 2 in its longitudinal direction. However, the portion 2a from which the crack 10 is detected is generally opposite from the side on which the probe 3 is disposed and the portion 1a of the welded part 2 on the side 1b of the steel plate 1 on which the probe 3 is mounted is uneven and meanders and its marginal edges 2b are not neatly formed to be parallel with the portion 2a on the back thereof from which cracks or the like are detected. Accordingly, it is seriously difficult to move the probe 3 in the aforesaid manner for flaw detection while holding the distance D between the probe 3 and the portion 2a constant throughout the flaw detection. Therefore, the time until the echoes 8 and 9 are obtained from the transmission of the wave 4 to the probe 3 is not constant and in the case of picking up the flaw echo 12 with a gate signal produced a predetermined time after the transmission of the wave 4 to the probe 3 as described previously, there is the possibility that the echo 8 or 9 is picked up as a flaw echo or the necessary flaw echo 12 is not picked up as a defect echo.

Figure 4:
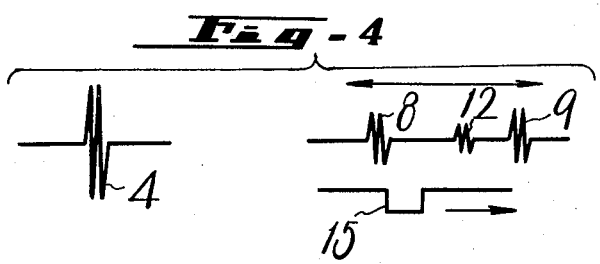

In view of this, as shown in FIG. 4 it is also considered possible to shift a gate signal 15 of relatively narrow pulse width in accordance with propagation of the ultrasonic beam and to sequentially pick up the echo 8, the flaw echo 12 and the echo 9 and, as shown in FIG. 5, supply the picked-up signal outputs to a recording pen 16, by which the pen 16 is moved on a recording paper 17 in its widthwise direction in synchronism with the shift of the gate signal 15 as indicated by an arrow 18, the recording paper 17 being fed in synchronism with the movement of the probe 3, to record the echoes 8 and 9 and the flaw echo 12 therebetween on the recording paper 17, thus detecting cracks or the like in the welded part.

In this case, however, it is extremely difficult in terms of circuit construction to shift the gate signal 15 accurately and stably in accordance with the propagation of the ultrasonic beam and it is also extremely difficult to move to the recording pen 16 in synchronism with the shift of the gate signal 15, so that this method is very difficult to be practised.

Referring now to FIGS. 6 and 7, one example of the ultrasonic flaw detector of this invention will hereinafter be described. In the figures, the same reference numerals as those in the foregoing figures indicate the same elements and signals.

In FIG. 6, reference numeral 19 designates a trigger pulse generator circuit, which provides trigger pulses 20 at predetermined intervals as shown in FIG. 7A. The trigger pulse 20 is applied to an ultrasonic pulse generator circuit 21 to provide a pulse signal 22 for production of ultrasonic pulse wave such as depicted in which 7B which is a little behind the trigger pulse 20. The pulse signal 22 is then applied to the probe 3 to emit an ultrasonic beam therefrom as described previously. From the probe 3 are obtained the transmitted ultrasonic wave 4 at the time of its excitation by the pulse signal 22, the echoes 8 and 9 and the flaw echo 12 which is produced in the case of the crack 10 or the like is present in the welded part 2 as shown in FIG. 7C, and they are supplied to a receiver 23, the output of which is applied to a plurality of, for example, seven AND-gate circuits 24A to 24G in common. While, the trigger pulse 20 derived from the trigger pulse generator circuit 19 is supplied to a delay circuit 25 which is formed with, for example, a monostable multivibrator, to derive therefrom a pulse signal 26 such as shown in FIG. 7D which is delayed a predetermined time T behind the trigger pulse 20. The pulse signal 26 thus obtained is fed to a gate signal generator circuit 27 formed with, for example, shift registers, to derive therefrom a plurality of, in the illustrated example, seven gate signals 28A to 28G such as shown in FIG. 7E which has a predetermined pulse width $\tau$ respectively and are sequentially arranged while being continuously delayed in time behind the preceding ones. These gate signals 28A to 28G are supplied to the aforesaid gate circuits 24A to 24G corresponding thereto respectively. The detected outputs separately derived from these gate circuits 24A to 24G are supplied as digital signals through waveform processing circuits such as peak hold circuits 29A to 29G to a plurality, that is, seven recording pens 31A to 31G which are arranged on a recording paper 30 in its width-wise direction which is supplied in synchronism with the movement of the probe 3. While, the output from the receiver 23 is also supplied to a Braun tube 32 to be displayed thereon.

The overall range of time in which the gate signals 28A to 28G are obtained is selected such that even if the distance D between the probe 3 and the portion 2a to be examined for flaw detection changes during the aforementioned movement of the probe 3 to cause a change in the time of obtaining each of the echoes 8 and 9 relative to the time of the trigger pulse 20, they may well be in the range of time in which the gate signals 28A to 28G are produced, and the delay time T due to the delay circuit 25 and the pulse width $\tau$ of each of the gate signals 28A to 28G are made variable for adjustment at will. The numbers of the gate circuits and the gate signals corresponding thereto and, in the case of recording on the recording paper 30 as in the illustrated example, the number of recording pens are also selected suitably in view of the point described above.

With the arrangement described above, as will be seen from FIGS. 7C and 7E, the echoes 8 and 9 are picked up with, for example, the gate signals 28B and 28F from the gate circuits 24B and 24F and if the flaw echo 12 is present, it is picked up with, for example, the gate signal 28E from the gate circuit 24E. Where these detected signals are recorded on the recording paper 30 as in the illustrated example, the detected outputs corresponding to the echoes 8 and 9 are supplied to, for example, the pens 31B and 31F and the detected output corresponding to the flaw echo 12 is supplied to, for example, the pen 31E.

In this case, since the range of time in which the gate signals 28A to 28G are obtained is selected in the above-described manner, even if the distance D between the probe 3 and the portion 2a varies to cause a change in the time of obtaining each of the echoes 8 and 9 and consequently the time of obtaining the flaw echo 12 relative to that of the trigger pulse 20 during the movement of the probe 3 in the lengthwise direction of the welded part 2, the result is only such that the echoes 8 and 9 are derived from the gate circuits 24A and 24E by the gate signals 28A and 28E respectively and that the flaw echo 12 is derived from the gate circuit 24D by the gate signal 28D or that the echoes 8 and 9 are derived from the gate circuits 24C and 24G by the gate signals 28C and 28G and that the flaw echo 12 is derived from the gate circuit 24F by the gate signal 28F. In short, the echoes 8 and 9 are always obtained from any two of the gate circuits and the flaw echo is obtained from any one of the gate circuits therebetween. In the case of recording then on the recording paper 30, the pens arranged in the widthwise direction of the recording paper 30 are selected corresponding to the gate circuits from which the echoes are derived, and hence the recording points on the recording paper 30 are only shifted in the widthwise direction of the paper 30 as will be apparent from FIG. 6. Accordingly, cracks or the like can be positively detected irrespective of a change in the distance D between the probe 3 and the portion 2a during the movement of the probe 3.

It is also possible that the detected signals separately derived from the gate circuits 24A to 24G are supplied to a computer for suitable processing.

In accordance with the device of this invention, it is possible with a simple construction to achieve flaw detection automatically and positively even if the distance between the probe and the portion to be examined for detecting cracks or the like varies during operation, as has been described in the foregoing. In addition, in the case of recording detected outputs on a recording paper as in the illustrated example, the presence and the position of a crack or the like can be visually known and if the detected outputs are supplied to a computer, they can easily be processed variously.

It will be apparent that many modifications and variations may be effected without departing from the scope of the novel concepts of this invention.

What is claimed is:

1. An ultrasonic flaw detector for detecting flaws in a weld joint between plates wherein the weld joints may be non uniform and vary in distance from a reference plane comprising an ultrasonic probe moveable parallel to said reference plane across one of said plates to transmit and receive ultrasonic energy into said weld joint, an ultrasonic pulse generator connected to said probe to periodically pulse it, a trigger pulse generator connected to said ultrasonic generator to energize it, a delay circuit receiving an input from said trigger pulse generator and producing a delayed output pulse, a gate signal generator comprising a plurality of shift registers having a plurality of output terminals receiving said delayed pulse from said delay circuit and producing a plurality of pulses sequentially spaced in time at said plurality of output terminals, a receiver connected to said probe, a plurality of AND gates each receiving the output of said receiver and each of said AND gates connected to different ones of said plurality of output terminals of said gate signal generator to time sequentially pass the output of said receiver, and recording means having a moveable record medium and a plurality of recording pens respectively connected to said plurality of AND gates such that a record is made on said recording medium which correctly indicates the position of flaws in said weld joint relative to the junctions of said joint with said plates even though said probe may not remain a fixed distance from said junctions.

2. An ultrasonic flaw detector according to claim 1 further including a plurality of peak hold circuits respectively connected between said plurality of AND gates and said plurality of recording pens.

3. An ultrasonic flaw detector according to claim 2 including a cathode ray tube also connected to the output of said receiver.

* * * * *